Nov. 6, 1956 G. R. FRIE ET AL 2,769,657
MOTOR VEHICLE WINDOW MOUNTING WITH DRAINAGE TROUGH
Filed Nov. 4, 1953
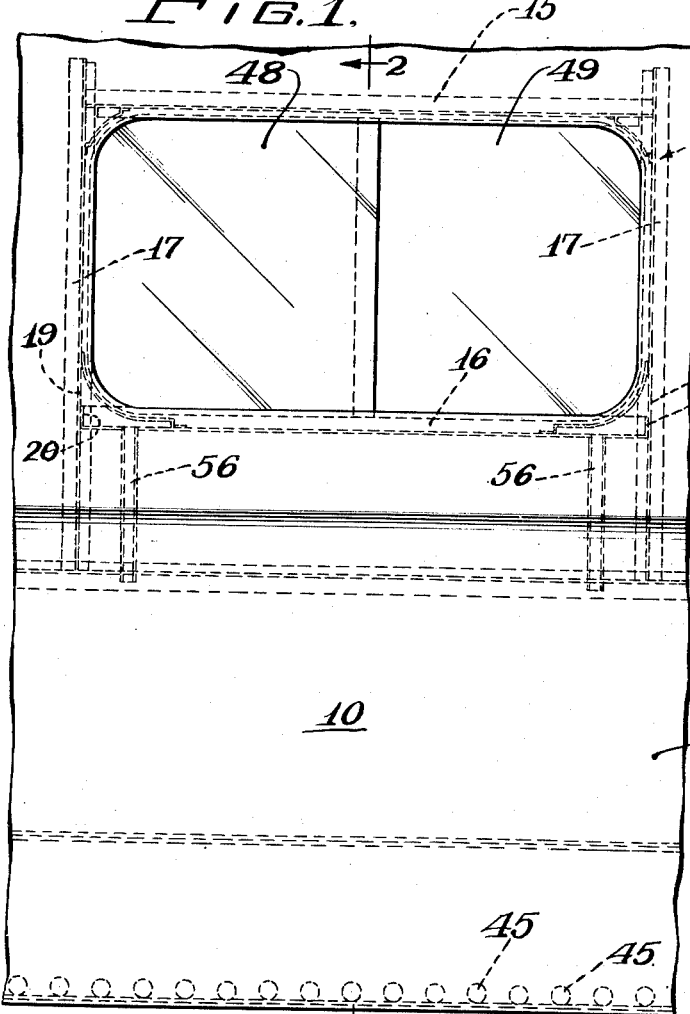
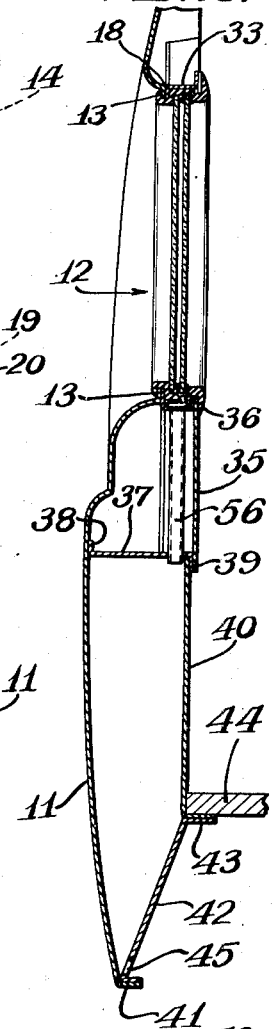
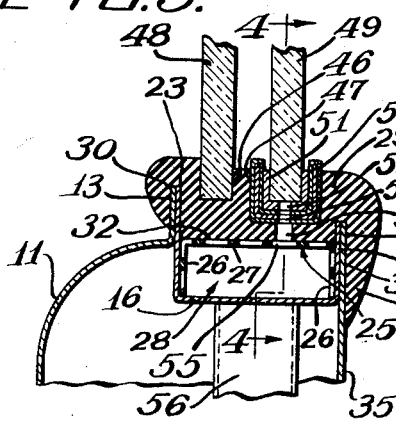
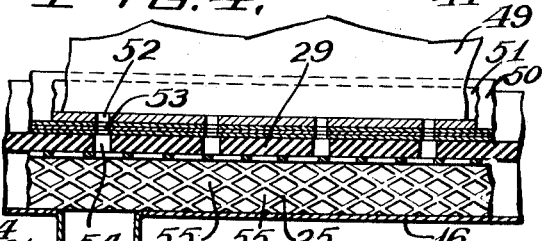
Inventors:
George R. Frie
Richard E. McGonigal
Louis M. Benkert
Paul O. Pippel Atty.

United States Patent Office 2,769,657
Patented Nov. 6, 1956

2,769,657

MOTOR VEHICLE WINDOW MOUNTING WITH DRAINAGE TROUGH

George R. Frie, Fort Wayne, Ind., Richard E. McGonigal, Springfield, Ohio, and Louis M. Benkert, Birmingham, Mich., assignors to International Harvester Company, a corporation of New Jersey Application November 4, 1953, Serial No. 390,126

10 Claims. (Cl. 296—47)

This invention relates to motor vehicle bodies and more particularly to a simple and economical means for mounting a pair of window panes in a single window opening in a vehicle body for covering the window opening, which window panes are relatively slidable in an endwise direction to partially open the window opening.

Heretofore, it has been the practice of motor vehicle body designers and manufacturers when mounting a pair of complemental, relatively slidable window panes in a single window opening to rely solely upon the sealing means outlining the window opening for forming a tight joint between the window panes and the vehicle body to prevent the infiltration of moisture or rain at the edges of the window opening to within the vehicle body. The window panes are generally supported for relative movement in a rubber-like element which, in turn, is connected to the vehicle body portion outlining the window opening. Obviously, by providing a mounting construction wherein the sealing element gripped the glass panes tightly an effective seal was formed but, by the same token, the ease at which the window panes could be moved endwise relative to each other was impaired. Furthermore, continual sliding of the window panes to open and close the window caused the sealing element to wear and ultimately lose its sealing qualities and thus permit moisture and rain to enter the interior of the vehicle body. It is, therefore, the primary objective of the present invention to provide a new and improved window mounting for a window of the type including a pair of complemental window panes adapted to slide relative to each other in an endwise direction in which the seal between the panes, when in their closed positions, and the vehicle body is effective to prevent moisture and rain from entering the body even after a long period of use and the window panes are readily moved with respect to each other to open and close the window with a minimum of manual effort.

Another object is the provision of a novel sealing element having a pair of parallel channels or grooves formed therein for receiving and retaining a pair of relatively slidable window panes.

A further object is to provide a horizontal trough below the lowermost section of the sealing element for receiving the water accumulating at the joint between the window panes and the vehicle body and to provide means for conducting the water received by the trough to the exterior of the vehicle body.

A still further object is the provision of a sealing element having an outwardly facing groove for receiving part of the vehicle body structure, a pair of inwardly facing grooves in which window panes are relatively slidably sealed in a weather tight manner and an outwardly projecting lip to overlap an edge portion of a trim panel to secure the same to the inner sheet metal panel of the vehicle body.

The foregoing and other important objects and desirable features inherent in and encompassed by the invention, together with many of the purposes and uses thereof, will become readily apparent from a reading of the ensuing description in conjunction with the annexed drawings, in which:

Figure 1 is a side elevational view of a portion of a vehicle body incorporating the invention;

Figure 2 is a cross-sectional view taken substantially along line 2–2 of Figure 1;

Figure 3 is an enlarged, detailed sectional view of the lower section of the sealing strip; and Figure 4 is a sectional view taken substantially along line 4–4 of Figure 3.

Referring to the drawings, wherein like reference characters represent like elements throughout the various views, a side portion 10 of an enclosed vehicle body such as a bus or station wagon is shown. The side portion 10 includes an outer sheet metal panel 11 provided with a generally rectangular window opening 12 which is outlined by an inwardly projecting flange 13.

The window frame, designated generally by numeral 14, includes a top member 15 vertically spaced above a bottom member 16 and a pair of vertically extending, horizontally spaced side members 17. The top and side members 15 and 17, respectively, are substantially Z-shaped in section. One leg 18 of each of the top and side members 15, 17 is adapted to be positioned in abutting relationship with a section of the inwardly projecting marginal flange 13 and be secured thereto by welding. The bottom member 16, as best shown in Figures 2 and 3, is U-shaped in section and extends horizontally between the webs 19 of the side members 17 and the extreme end portions 20 of the web 21 of the bottom member 16 are bent 90° and secured to the webs 19 by any suitable means. Referring to Figure 3, it will be noted that one leg 23 of the bottom member 16 has a greater height than the other leg 24 and that the leg 23 abuts the lowermost section of the flange 13 and is welded thereto.

Nested in and supported by the bottom member 16 is an expanded metal, inverted channel-shaped element 25 which has a length substantially equal to the length of the bottom member 16. The heights of the legs 26 of the element 25 are substantially equal and less than the heights of the legs 23, 24 of the bottom member 16 whereby an upwardly facing pocket is formed. The web 27 of the element 25 serves as the bottom wall of the pocket as well as the top wall of a trough, designated generally by numeral 28. The purpose of the trough 28 will be explained hereinafter.

A unitary resilient sealing strip 29, made of rubber or similar suitable material, is molded to provide a cross-section substantially of the form shown in Figure 3 of the drawing and is adapted to be mounted in the window frame 14. The sealing strip 29 is formed with a pair of parallel, outwardly facing grooves 30, 31 in the outer periphery thereof. The outboard groove 30 is capable of receiving and firmly embracing the marginal flange 13 of the outer panel 11 as well as the legs 18 of the top and side members 15, 17 and the upper portion of the leg 23 of the bottom member 16. When the sealing strip 29 is assembled in the window frame 14, the outer peripheral surface 32 thereof bears tightly against the webs 19 of the side members 17, the web 33 of the top member 15, and the web 27 of the element 25. As best shown in Figure 3, the inboard groove 31 is capable of accommodating upper marginal edge of the leg 24 and the marginal edge 34 of a trim panel 35 which is vertically disposed and adapted to abut the leg 24. The sealing strip 29 is provided with an outwardly projecting lip 36 which yieldably urges the marginal edge 34 of the trim panel 35 into engagement with the leg 24 and thus serves as a means for securing a portion of the trim panel 35 to the outer panel 11.

Referring to Figure 2, a substantially Z-shaped panel 37 has one flange 38 welded to the outer panel 11 and its other flange 39 similarly secured to a vertically disposed inner sheet metal panel 40. Extending upwardly and inwardly from the lower marginal edge 41 of the outer panel 11 to which it is connected is a sheet metal panel 42. The uppermost edge 43 of the panel 42 is secured to the lowermost edge of the inner panel 40. The body floor 44 (partially shown in Figure 2), is suitably joined to the panels 40 and 42. A plurality of spaced apertures 45 are formed in the panel 42 adjacent the juncture of the outer panel 11 and the panel 42 for a purpose which will be explained hereinafter.

The sealing strip 29 is provided with a pair of inwardly opening window pane receiving grooves 46, 47 spaced between the grooves 30 and 31 and arranged in spaced parallel planes. In the construction shown in Figure 3, a pair of generally rectangular, complemental window panes 48, 49 are provided for bridging and thus closing the window opening 12. One end edge and the top and bottom edges of the outermost window pane 48 are adapted to be positioned in the groove 30 and gripped by the sealing strip 29 in a weather-tight manner. The lateral width of groove 31 is somewhat larger than the width of groove 30 in order to accommodate the witdh of a metal guide channel 50 as well as the thickness of the innermost window pane 49. The inner surfaces of the guide channel 50 are covered with velvet 51 or similar suitable material. The top and bottom edges and one end edge are firmly yet slidably received in the velvet-covered guide channel 50 whereby the window pane 49 may be easily and freely slid in an endwise direction to uncover slightly less than one half of the window opening 12. It is to be understood that while only one window pane is shown slidably mounted both could be made to slide relatively to the window frame 14 without departing from the spirit and scope of the invention.

It will be appreciated that by providing velvet material in the guide channel 50 the frictional resistance of the window pane 49 to sliding is decreased but by the same token, the effectiveness of the weather-tight seal between the pane 49 and window frame 14 is decreased. Hence in order to prevent the entrance of water and moisture into the interior of the vehicle body and thereby damage the upholstery during adverse weather conditions, the lower run of the velvet covering 51, guide channel 50, and sealing strip 29 are provided with a plurality of longitudinally spaced sets of passages 52, 53, 54 respectively, which are registerable with openings 55 in the web 27 of the element 25 whereby water seeping between the window pane 49 and the sealing strip 29 flows to the trough 28 rather than to the interior of the body. Water which collects in the trough 28 is conducted downwardly through a pair of longitudinally spaced drain tubes 56 which each have one of their ends in communication with the trough 28 and their opposite ends extending through and supported by the panel 37. The water is then discharged through the apertures 45 formed in the panel 42 to a point exteriorly of the vehicle body.

The embodiment of the invention chosen for the purposes of illustration and description herein is that preferred for achieving the objects of the invention and developing the utility thereof in the most desirable manner, due regard being had to existing factors of economy, simplicity of design and construction, and the improvements sought to be effected. It will be appreciated, therefore, that the particular structural and functional aspects emphasized herein are not intended to exclude, but rather to suggest such other adaptations and modifications of the invention as fall within the spirit and scope of the invention as defined in the appended claims.

What is claimed is:

1. In a vehicle body, a body panel having a window opening defined by an inwardly projecting flange; a window frame including top, bottom, and side members secured to said body panel, said bottom member being substantially U-shaped in section and having one leg thereof abutting and secured to said flange, said frame further including an elongated, perforated element having an inverted channel shape in section supported on the web of said bottom member whereby the webs of said member and element are vertically spaced from each other and define the lower and upper walls, respectively, of a trough; a resilient sealing strip seated in said window frame having an outwardly facing groove for receiving said flange, a section of the outer peripheral surface of said strip being adapted to abut the upper wall of said trough, said strip section being confined by and between the legs of said bottom member, said sealing strip further having a pair of inwardly facing grooves formed in the inner periphery thereof arranged in spaced parallel planes for supporting a pair of relatively slidable window panes, said strip section having a plurality of passages formed therein extending from one of said inwardly facing grooves to the outer peripheral surface of said strip section, said passages being registerable with perforations in said top wall of said trough; and conduit means leading from said trough to a point exteriorly of the vehicle body.

2. In a vehicle body substantially as set forth in claim 1, in which said resilient sealing strip is provided with a second outwardly facing groove, a portion of said second groove being adapted to receive the upper edge of a leg of said bottom member; a trim panel having an edge portion abutting said last mentioned leg and extending into said second groove; and outwardly extending, yieldable lip means integrally formed with said sealing strip engageable with said trim panel for maintaining said trim panel in abutting engagements with said leg.

3. In a vehicle body, a body panel having a window opening defined by an inwardly projecting flange; a window frame including top, bottom, and side members secured to said body panel, said bottom member being substantially U-shaped in section and having one leg thereof abutting and secured to said flange, said frame further including an elongated element having an inverted channel shape in section supported on the web of said bottom member whereby the webs of said member and element are vertically spaced from each other and define the lower and upper walls, respectively, of a trough; a resilient sealing strip seated in said window frame having a groove for receiving said flange, a section of the outer peripheral surface of said strip being adapted to abut the upper wall of said trough, said strip section being confined by and between the legs of said bottom member, said sealing strip further having a pair of grooves formed in the inner periphery thereof arranged in spaced parallel planes for supporting a pair of relatively slidable window panes; means for establishing fluid communication between at least one of said grooves and said trough; and conduit means leading from said trough to a point exteriorly of the vehicle body.

4. In a vehicle body, a body panel having a window opening; a window frame secured to said body panel about said opening, said frame including a bottom member extending horizontally the length of and positioned below the lower marginal edge of said opening, said bottom member being substantially U-shaped in section, said frame further including an elongated element having an inverted channel shape in section supported on the web of said bottom member whereby the webs of said member and element are vertically spaced from each other and define the lower and upper walls, respectively, of a trough; a resilient sealing strip seated in said window frame and secured to said body panel, a section of the outer peripheral surface of said strip being adapted to abut the upper wall of said trough, said strip having a pair of grooves formed in the inner periphery thereof arranged in spaced parallel planes for supporting a pair of relatively slidable window panes; means for establishing fluid communication between at least one of said grooves and said trough; and conduit means leading from said trough to a point exteriorly of the vehicle body.

5. In a vehicle body, a body panel having a window opening; a window frame secured to one side of said body panel about said opening, said frame including an enclosed trough extending horizontally the length of and positioned below the lower marginal edge of said opening, said trough having a substantially flat, horizontally disposed upper wall projecting from one side of said body panel; a resilient sealing strip extending about said opening and secured to said body panel, a section of the outer peripheral surface of said strip being adapted to abut the upper wall of said trough and be supported thereby, said strip having a pair of grooves formed in the inner periphery thereof arranged in spaced parallel planes for supporting a pair of relatively slidable window panes; means for establishing fluid communication between at least one of said grooves and said trough including vertically extending openings formed in said seal strip section abutting the upper wall of said trough, said openings extending from at least one of said grooves and the upper wall of said trough; and conduit means leading from said trough to a point exteriorly of the vehicle body.

6. In a vehicle body, a body panel having a window opening; an enclosed trough positioned below the lower marginal edge of said opening and disposed on one side of said body panel; sealing means secured to said body panel about the periphery of said opening and having a pair of grooves formed in the inner periphery thereof arranged in spaced parallel planes for supporting a pair of relatively slidable window panes, a portion of said sealing means being adapted to abut said trough and be supported thereby; means for establishing fluid communication between at least one of said grooves and said trough including a plurality of openings formed in said sealing means, said openings extending from at least one of said grooves and said trough; and conduit means leading from said trough to a point exteriorly of the vehicle body.

7. In a vehicle body, a body panel having a window opening defined by an inwardly projecting flange; a window frame secured to said body panel about said opening, said frame including a bottom member, said bottom member being substantially U-shaped in section and having one leg thereof abutting and secured to said flange, said frame further including an elongated element having an inverted channel shape in section supported on the web of said bottom member whereby the web of said elongated element is vertically spaced from the web of said bottom member and lies in a substantially horizontal plane containing the base of a section of said flange; a resilient sealing strip seated in said window frame having a groove for receiving said flange, a section of the outer peripheral surface of said strip being adapted to abut the web of said elongated element, said strip section being confined by and between the legs of said bottom member, said sealing strip further having a pair of grooves formed in the inner periphery thereof arranged and spaced parallel planes for supporting a pair of relatively slidable window panes.

8. In a vehicle body substantially as set forth in claim 7, in which said resilient sealing strip is provided with a second outwardly facing groove, a portion of said second groove being adapted to receive the upper edge of a leg of said bottom member; a trim panel having an edge portion abutting said last-mentioned leg and extending into said second groove; and outwardly extending, yieldable lip means integrally formed with said sealing strip engageable with said trim panel for maintaining said trim panel in abutting engagement with said leg.

9. In a vehicle body, a body panel having a window opening defined by an inwardly projecting flange; a window frame including a bottom structure, said bottom structure being substantiallly U-shaped in section and having one leg thereof abutting and secured to said flange, said bottom structure further including a web extending between the legs of said bottom structure and lying in a substantially horizontal plane containing the base of a section of said flange; a resilient sealing strip seated in said window frame having a groove for receiving said flange, a section of the outer peripheral surface of said strip being adapted to abut the web of said bottom structure, said strip section being confined by and between the legs of said bottom structure, said sealing strip further having a pair of grooves formed in the inner periphery thereof arranged and spaced parallel planes for supporting a pair of relatively slidable window panes.

10. In a vehicle body substantially as set forth in claim 9, in which said resilient sealing strip is provided with a second outwardly facing groove, a portion of said second groove being adapted to receive the upper edge of a leg of said bottom structure; a trim panel having an edge portion abutting said last-mentioned leg and extending into said second groove; and outwardly extending, yieldable lip means integrally formed with said sealing strip engageable with said trim panel for maintaining said trim panel in abutting engagement with said leg.

References Cited in the file of this patent

UNITED STATES PATENTS

| 2,138,374 | Edwards | Nov. 29, 1938 |
| 2,572,124 | Eichner | Oct. 23, 1951 |

FOREIGN PATENTS

| 594,907 | France | July 6, 1925 |
| 578,362 | Great Britain | June 25, 1946 |
| 609,665 | Great Britain | Oct. 5, 1948 |